United States Patent [19]
Shiraishi et al.

[11] Patent Number: 5,756,660
[45] Date of Patent: May 26, 1998

[54] PROCESS FOR PRODUCING POLYETHYLENE MATERIAL OF HIGH STRENGTH AND HIGH PLASTIC MODULUS

[75] Inventors: Takeichi Shiraishi, Kawasaki; Yoshiyuki Shimo, Yokohama; Seizo Kobayashi, Yokohama, all of Japan

[73] Assignee: Nippon Oil Company, Limited, Tokyo, Japan

[21] Appl. No.: 725,058

[22] Filed: Oct. 2, 1996

Related U.S. Application Data

[63] Continuation of Ser. No. 579,470, Dec. 27, 1995, abandoned, which is a continuation of Ser. No. 184,003, Jan. 19, 1994, abandoned.

[30] Foreign Application Priority Data

Jan. 20, 1993 [JP] Japan .................. 5-039210

[51] Int. Cl.$^6$ .......................................... C08F 6/26
[52] U.S. Cl. ................................................ 528/502 B
[58] Field of Search ................................. 528/502 B

[56] References Cited

U.S. PATENT DOCUMENTS

| | | | |
|---|---|---|---|
| 3,684,782 | 8/1972 | Longi et al. | 528/502 |
| 3,800,008 | 3/1974 | Starkweather, Jr. | 528/502 |
| 4,972,035 | 11/1990 | Suga et al. | 526/125 |
| 5,331,071 | 7/1994 | Kataoka et al. | 526/127 |

*Primary Examiner*—Thomas R. Weber
*Attorney, Agent, or Firm*—Dilworth & Barrese

[57] ABSTRACT

A polyethylene article such as film or fiber having high strength and high elastic modulus is produced by orienting an ultra-high molecular weight polyethylene having an intrinsic viscosity at 135° C. in decalin of 5 to 50 dl/g, said ultra-high molecular weight polyethylene being prepared by homo- or copolymerizing ethylene in the presence of a catalyst system and hydrogen, said catalyst system comprising (1) a solid catalyst component containing at least magnesium, titanium and/or vanadium, (2) an organometallic compound and (3) a compound represented by the following general formula [I]:

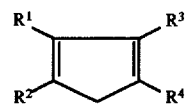

where $R^1$, $R^2$, $R^3$ and $R^4$ are each hydrogen or a hydrocarbon residue, with the proviso that any two of $R^1$, $R^2$, $R^3$ and $R^4$ may conjointly form a cyclic hydrocarbon residue.

20 Claims, 1 Drawing Sheet

PROCESS FOR PRODUCING POLYETHYLENE MATERIAL OF HIGH STRENGTH AND HIGH PLASTIC MODULUS

This is a continuation of application Ser. No. 08/579,470 filed on Dec. 27, 1995, now abandoned which is a continuation of application Ser. No. 08/184,003 filed Jan. 19, 1994, now abandoned.

BACKGROUND OF THE INVENTION

The present invention relates to a process for producing polyethylene materials (e. g. fibers and films) of high strength and high elastic modulus and more particularly a process of producing polyethylene materials of high strength and high elastic modulus by stretching ultra-high molecular weight polyethylenes which are obtained by combining a specific catalyst with a specific polymerization method.

So-called ultra-high molecular weight polyethylenes which are extremely high in molecular weight, not less than about 1,000,000, are superior in impact resistance and abrasion resistance, having a self-lubricating property, and are used as characteristic engineering plastics for hopper, silo, various gears, lining and ski lining in various fields, including the fields of food machinery, civil engineering machinery, chemical machinery, agriculture, mining, sports and leisure.

Since such ultra-high molecular weight polyethylenes are much higher in molecular weight than general-purpose polyethylenes, there is the possibility that oriented products of higher strength and elastic modulus than before will be obtained if such polyethylenes can be highly oriented. For this reason, various studies have been made for attaining their high orientation. However, in comparison with general-purpose polyethylenes, ultra-high molecular weight polyethylenes are extremely high in melt viscosity, so the extrusion thereof can scarcely be effected by the conventional method, nor is it possible to stretch them to a- high degree of orientation. This is the present situation.

JP56-15408A discloses a method wherein a gel obtained from a solution (dope) of an ultra-high molecular weight polyethylene in decalin is stretched at a high stretch ratio to afford a fiber of high strength and high elastic modulus. However, the said method has been practised only at such extremely low polymer concentrations in decalin as 3 wt % in the case of a polyethylene having a weight average molecular weight of $1.5 \times 10^6$. Thus, in practical application of the said method, it is necessary to use a large amount of a solvent, and in economic aspects, including preparation and handling of a high viscosity solution, the method in question is extremely disadvantageous.

For overcoming the above-mentioned problems, proposals have been made also as to highly stretching and orienting ultra-high molecular weight polyethylenes by extrusion and stretching or rolling at a temperature below the melting points of the polyethylenes [see, for example, JP 59-187614A, JP 60-15120A, JP 60-97836A and Kobunshigakkai Yokoshu-Vol. 34, No. 4, p. 873, (1985)].

According to the conventional methods, however, an ultra-high molecular weight polyethylene is made beforehand into a dilute solution in a solvent such as xylene, decalin or kerosene, followed by cooling or isothermal crystallization, and using the resulting single crystal mat, there are performed solid-phase extrusion and stretching. In this case, however, there still remains the problem that a large amount of a solvent must be used at the time of preparing such single crystal mat.

On the other hand, an ultra-high molecular weight polyethylene can be subjected directly to solid-phase extrusion and stretching without using a single crystal mat, but in the case of a one-stage polymer which is usually employed, the pressure in the extrusion becomes extremely high, the extrusion speed is low, it is impossible to increase the stretch ratio, and the strength and elastic modulus of the resulting stretched article are low. Therefore, improvement has been desired.

It is the object of the present invention to solve the aforementioned problems of the prior art.

SUMMARY OF THE INVENTION

In view of the foregoing the present inventors have made extensive studies for solving the above-mentioned problems, and as a result we found out that a polyethylene material of higher strength and elastic modulus than in the prior art could be produced by orienting an ultra-high molecular weight polyethylene obtained by combination of a specific catalyst with a specific polymerization method.

More particularly, the present invention relates to a process of producing a polyethylene material of high strength and high elastic modulus by orienting an ultra-high molecular weight polyethylene which is prepared by homo- or copolymerization of ethylene in the presence of a catalyst system and hydrogen and which has an intrinsic viscosity at 135° C. in decalin of 5 to 50 dl/g, the said catalyst system comprising (1) a solid catalyst component containing at least magnesium, titanium and/or vanadium, (2) an organometallic compound and (3) a compound represented by the general formula [1].

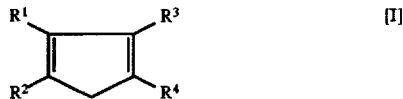

where $R^1$, $F^2$, $R^3$ and $R^4$ are each hydrogen or a hydrocarbon residue, provided any two of $R^1$, $R^2$, $R^3$ and $R^4$ may conjointly form a cyclic hydrocarbon residue.

DETAILED DESCRIPTION OF THE INVENTION

Figure 1:
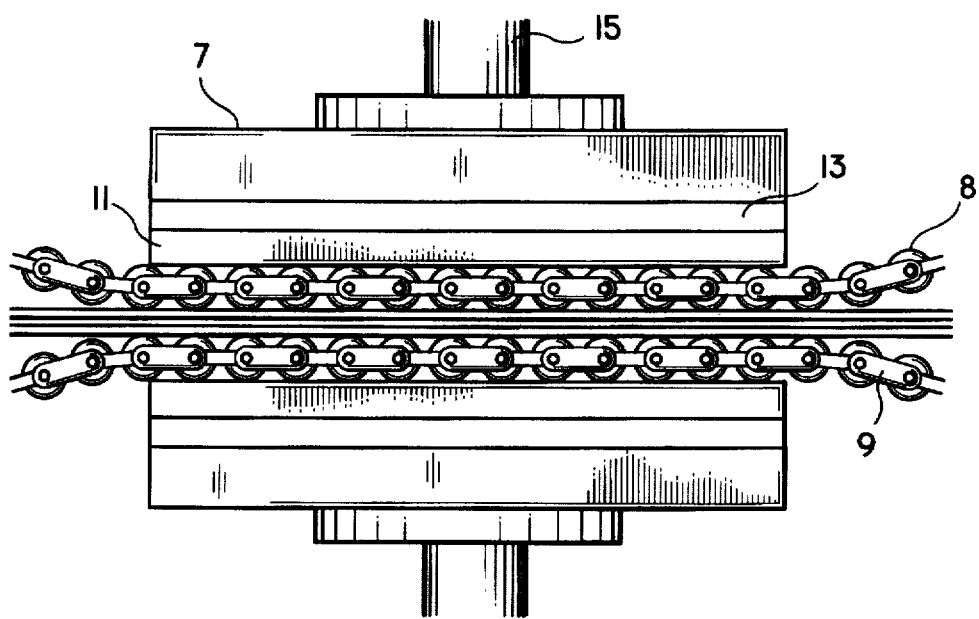
FIG. 1 is a schematic diagram showing an example of apparatus employable in the manufacturing apparatus of the present invention.

The present invention will be described in detail hereinunder.

(1) Preparation of Ultra-High Molecular Weight Polyethylene

The ultra-high molecular weight polyethylene used in the present invention is prepared by homo- or copolymerization of ethylene in the presence of a catalyst system and hydrogen, the said catalyst system comprising (1) a solid catalyst component containing at least magnesium, titanium and/or vanadium, (2) an organometallic compound and (3) a compound represented by the general formula [I]

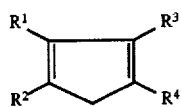

where $R^1$, $R^2$, $R^3$ and $R^4$ are each hydrogen or a hydrocarbon residue, provided any two of $R^1$, $R^2$, $R^3$ and $R^4$ may conjointly form a cyclic hydrocarbon residue.

Reference will first be made to the solid catalyst component [component (1)] containing at least magnesium, titanium and/or vanadium.

1) Component (1)

The component (1) used in the invention, which essentially contains compounds of magnesium, titanium and/or vanadium, is obtained by mutually contacting those compounds.

As examples of magnesium compounds there are mentioned in addition to metal magnesium, magnesium hydroxide, magnesium carbonate, magnesium oxide, compounds of the general formula $MgR_m(OR')_nX_{2-m-n}$ where R and R' are each a hydrocarbon radical having 1 to 20, preferably 1 to 12, carbon atoms, X is a halogen atom, n and m are in the ranges of $0 \leq n \leq 2$ and $0 \leq m \leq 2$, provided $0 \leq m+n \leq 2$, as well as double salts, compound oxides, carbonates, chlorides and hydroxides, which contain both magnesium atom and a metal selected from silicon, aluminum and calcium, and further, products obtained by treating or reacting these magnesium-based inorganic solid compounds with water, organic oxygen-containing compounds, such as alcohols, phenols, ketones, aldehydes, carboxylic acids, esters, polysiloxanes or acid amides, inorganic oxygen-containing compounds such as metal alkoxides and oxyacid salts of metals, organic sulfur-containing compounds such as thiols and thioethers, inorganic sulfur-containing compounds such as sulfur dioxide and sulfur trioxide, as well as sulfur, mono- and polycyclic aromatic hydrocarbons such as benzene, toluene, xylene, anthracene and phenanthrene, or halogen-containing compounds such as hydrogen chloride, metal chlorides and organic halides, as well as chlorine. Particularly preferred are magnesium halides, e.g. magnesium chloride. As such magnesium halides there are used substantially anhydrous ones, and there may be used those which have been treated with electron donors such as, for example, alcohols, esters, ketones, carboxylic acids, ethers, amines or phosphines.

As examples of titanium compounds there are mentioned halides, alkoxylhalides, alkoxides and halogenated oxides of titanium, with tetravalent or trivalent titanium compounds being preferred.

As tetravalent titanium compounds are preferred those represented by the general formula $Ti(OR)_nX_{4-n}$ wherein R is a hydrocarbon radical, such as an alkyl aryl or aralkyl radical, having 1 to 20, preferably 1 to 12, carbon atoms, X is a halogen atom and n is $0 \leq n \leq 4$. Examples are such tetravalent titanium compounds as titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, tripropoxyrnonochlorotitanium, tetraisopropoxytitanium, monobutoxytrichlorotitanium, dibutoxydichlorotitanium, tributoxymonochlorotitanium, tetrabutoxytitanium, monopentoxytrichlorotitanium, monophenoxytrichlorotitanium, diphenoxydichlorotitanium, triphenoxymonochlorotitanium, tetrabenzyloxytitanium, monobenzyloxytrichlorotitanium, dibenzyloxydichlorotitanium, tribenzyloxymonochlorotitanium and tetrabenzyloxytitanium.

Examples of trivalent titanium compounds are those obtained by reducing titanium tetrahalides such as titanium tetrachloride and titanium tetrabromide with hydrogen, aluminum, titanium or organometallic compounds of Group I–III metals (e.g. aluminum) in the Periodic Table, as well as those obtained by reducing tetravalent alkoxytitanium halides of the general formula $Ti(OR)_mX_{4-m}$ where R is a hydrocarbon radical, such as an alkyl, aryl or aralkyl radical, having 1 to 20 carbon atoms, X is a halogen atom and m is $0<m<4$, with organometallic compounds of Group I–III metals in the Periodic Table.

Of the titanium compounds exemplified above, the tetravalent titanium compounds are particularly preferred.

Examples of vanadium compounds are tetravalent vanadium compounds such as vanadium tetrachloride, pentavalent vanadium compounds such as vanadium oxytrichloride and orthoalkyl vanadate, and trivalent vanadium compounds such as vanadium trichloride.

The titanium, magnesium and vanadium compounds exemplified above may be further contacted and reacted with aluminum halides. As aluminum halides there are used substantially anhydrous ones, and as examples thereof are mentioned aluminum fluoride, aluminum chloride, aluminum bromide, aluminum iodide, and mixtures thereof, with aluminum chloride being particularly preferred.

Also, the above magnesium, titanium and/or vanadium compounds (and further, aluminum halides if desired) may be further contacted and reacted with silicone compounds of the general formula $Si(OR')_nX_{4-n}$ where R' is a hydrocarbon radical, such as an alkyl, aryl or aralkyl radical, having 1 to 20, preferably 1 to 12, carbon atoms, and n is $0<n \leq 4$, preferably $0<n \leq 4$. The following are mentioned as examples of such silicone compounds:

$Si(OCH_3)_4$, $Si(OCH_2H_5)_4$, $Si(On-C_3H_7)_4$, $Si(On-C_4H_9)_4$, $Si(O-C_8H_{17})_4$, $Si(OC_{10}H_{21})_4$, $Si(OC_6H_5)_4$, $Si(OCH_2C_6H_5)_4$, $Si(OCH_3)_3Cl$, $Si(OCH_3)_2Cl_2$, $Si(OCH_3)Cl_3$, $Si(OCH_3)_3Br$, $Si(OC_2H_5)_3Cl$, $Si(OC_2H_5)_2Cl_2$, $Si(OC_2H_5)Cl_3$, $Si(OC_2H_5)_3Br$, $Si(ON-C_3H_7)_3Cl$ $Si(On-C_3H_7)_2Cl_2$, $Si(On-C_3H_7)Cl_3$, $Si$ $(On-C_3H_7)_3Br$, $Si(On-C_4H_9)_3Cl$, $Si(On-C_4H_9)_2Cl_2$, $Si(On-C_4H_9)Cl_3$, $Si(On-C_4H_9)_3Br$, $Si(O-C_8H_{17})_3Cl$, $Si(O-C_8H_{17})_2Cl_2$, $Si(O-C_8H_{17})Cl_3$, $Si(O-C_8H_{17})_3Br$, $Si(O-C_{10}H_{21})_3Cl$, $Si(O-C_{10}H_{21})_2Cl_2$, $Si(OC_{10}H_{21})Cl_3$, $Si(OC_{10}H_{21})Br$, $Si(OC_6H_5)_3Cl$, $Si(OC_6H_5)_2Cl_2$, $Si(OC_6H_5)Cl_3$, $Si(OC_6H_5)_3Br$, $Si(OCH_2C_6H_5)_3Cl$, $Si$ $(OCH_2C_6H_5)_2Cl_2$, $Si(OCH_2C_6H_5)Cl_3$, $Si$ $(OCH_2C_6H_5)_3Cl$ , with $Si(OR')_4$ being particularly preferred.

Further, the foregoing magnesium titanium and/or vanadium compounds (and aluminum halides and/or silicon compounds, if desired) may be contacted and reacted with ether compounds. Preferred as such ether compounds are those represented by the general formula $R^5OR^6$ where $R^5$ and $R^6$ are each a hydrocarbon residue, such as an alkyl radical, e.g. methyl, ethyl, propyl, butyl, pentyl, hexyl or octyl, an aryl radical, e.g. phenyl, tolyl, xylyl or naphthyl, or an aralkyl radical, e.g. benzyl, having 1 to 20, preferably 1 to 8, carbon atoms. Examples are dimethyl ether, methyl ethyl ether, methyl propyl ether, methyl hexyl ether, diethyl ether, ethyl propyl ether, ethyl iso-propyl ether, ethyl butyl ether, ethyl tert-butyl ether, ethyl hexyl ether, ethyl n-octyl ether, dipropyl ether, methyl propyl ether, propyl iso-propyl ether, propyl tert-butyl ether, propyl hexyl ether, propyl n-octyl ether, di-iso-propyl ether, iso-propyl butyl ether, iso-propyl tert-butyl ether, iso-propyl hexyl ether, iso-propyl n-oxtyl ether, dibutyl ether, butyl tert-butyl ether, butyl hexyl-ether, butyl n-oxtyl ether, di-tert-butyl ether, tert-butyl hexyl ether, tert-butyl n-octyl ether, dioctyl ether, octyl hexyl ether, diphenyl ether, phenyl methyl ether, phenyl ethyl ether, phenyl propyl ether, phenyl iso-propyl ether, phenyl butyl ether, phenyl tert-butyl ether, ally hexyl ether, allyl oxtyl ether, diallyl ether, allyl methyl ether, allyl ethyl ether, allyl propyl ether, allyl iso-propyl ether, allyl butyl ether, allyl tert-butyl ether, allyl hexyl ether, allyl octyl ether, allyl phenyl ether, diamyl ether and diisoamyl ether, with diethyl ether and dibutyl ether being particularly preferred.

In addition to these components there may be added any other components if only the object of the present invention is not impaired.

How to mutually contact the above constituents of the solid catalyst component is not specially limited. For example, the constituents may be contacted together (using, for example, ball mill, vibration mill, rod mill or impact mill) in the presence or absence of a solvent or diluent inert to the constituents. As the case may be, it is also preferable that, after the contact, the product obtained be washed with an inert diluent to remove excess transition metal compound such as titanium compound. As examples of such inert solvent there are mentioned hexane, heptane, toluene and cyclohexane. Preferably, the constituents are mixed and reacted under heating at a temperature of 20° to 200° C., more preferably 50° to 200° C., for 5 minutes to 10 hours, more preferably 10 minutes to 2 hours. Usually, these operations are performed in an inert gas (e.g. nitrogen or helium), it is desirable that moisture be avoided as far as possible.

As to the ratio of the constituents, it is not specially limited. For example, however, it is preferable that the reaction ratio of the magnesium compound and the titanium compound be in the range of 0.05 to 10, more preferably 0.1 to 5, in terms of Mg/Ti (mole ratio), and that of the aluminum halide and the silicon compound or there be in the range of 0.01 to 10, more preferably 0.1 to 5, in terms of Al/Si or ether (mole ratio). These ratios are mere examples and can vary in the presence of any other components.

Examples of the solid catalyst component employable in the present invention are those concretely described in JP 51-3514B, JP50-23864B, JP51-152B, JP 52-15111B, JP 49-106581B, JP 52-11710B, 51-153B, JP 56-65909A, JP 50-39470B, JP 54-12953B, JP 1-10529B, JP 1-12284B, JP 1-12285B, JP 1-7085B, JP 1-7086B, JP1-12287B, JP 1-12288B, JP 1-7087B, JP 1-8642B, JP 1-8043B, JP 1-7605B, JP 1-129006A, JP 2-70710A, JP 2-20510A, JP 4-145105A and JP 4-171431.

As the organometallic compound used in the present invention there may be used an organoaluminum compound. Preferred examples of organoaluminum compounds are those of the general formulae $R_3Al$, $R_2AlX$, $RAlX_2$, $R_2AlOR$, $RAl(OR)X$ and $R_3Al_2X_3$ where R is a hydrocarbon radical such as an alkyl radical, e.g. methyl, ethyl, propyl, butyl or hexyl, an aryl radical, e.g. phenyl or tolyl, or an aralkyl radical, e.g. benzyl, having 1 to 20, preferably 1 to 8, carbon atoms, provided the Rs may be the same or different, and X is a halogen atom. More concrete examples are triethylaluminum, triisobutylaluminum, trihexylaluminum, trioctylaluminum, diethylaluminum chloride, diethylaluminum ethoxide, ethylaluminum sesquichloride, and mixtures thereof. The amount of the organoaluminum compound to be used is not specially limited, but usually it is used in the range of 0.1 to 1,000 moles, preferably 0.5 to 500 moles, per mole of the titanium compound.

As a still further component of the catalyst used in the present invention there is used a compound of the general formula [I]

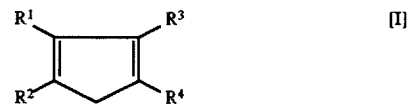

where $R^1$, $R^2$, $R^3$ and $R^4$ are each hydrogen or a hydrocarbon residue, provided any two of $R^1$, $R_2$, $R^3$ and $R^4$ may conjointly form a cyclic hydrocarbon residue. The "hydrocarbon residue" as referred to herein indicates a hydrocarbon radical or a substituted hydrocarbon radical. The hydrocarbon residue usually has 1 to 18, preferably 1 to 10, carbon atoms. As examples, in the case where any two or the Rs do not conjointly form a ring, mention may be made of alkyl radicals such as methyl, ethyl, propyl, butyl, pentyl, hexyl and octyl, aryl radicals such as phenyl, tolyl, xylyl and naphthyl, and aralkyl groups such as benzyl. On the other hand, in the case where a ring is formed, mention may be made of indenes, cyclopentacyclooctenes and fluorenes. More concrete examples are indene, methylindene, ethylindene, cyclopentadiene, ethylcyclopentadiene, dimethylcyclopentadiene, methylisopropylcyclopentadiene, trimethylcyclopentadiene, benzylcyclopentadiene, 1,4-diphenylcyclopentadiene, 1,2-dimethylindene, phenylindene, and mixture thereof. Also employable are polycycloic aggregates of these compounds, such as bicyclic system.

No special limitation is placed on how to used the catalyst components in the invention, that is, in what order the foregoing solid catalyst component, organometallic compound and compound of the general formula [I] are to be added. The polymerization of ethylene may be performed using a catalyst comprising the solid catalyst component and the organometallic compound and in the presence of the compound of the general formula [I]. Or the organometallic compound and the compound of the general formula [I] may be mixed or reacted together in advance. Of course, the object of the present invention can be achieved even by first contacting or reacting the solid catalyst component, organometallic compound and compound of the general formula [I] at a time and thereafter polymerizing ethylene.

The organometallic compound is used usually in an amount of 0.1 to 1,000 moles, preferably 0.5 to 500 moles, per mole of the titanium compound.

The compound of the general formula [I] is used usually in an amount of 0.01 to 100 moles, preferably 0.1 to 50 moles, more preferably 0.1 to 10 moles, per mole of the organometallic compound.

The ultra-high molecular weight polyethylene used in the present invention is prepared by slurry polymerization, solution polymerization or vapor-phase polymerization, preferably slurry polymerization, in the presence of the catalyst described above. As a polymerization, in the presence of the catalyst described above. As a polymerization solvent there is used an organic solvent inert to Ziegler type catalysts. Examples are saturated hydrocarbons such as butane, pentane, hexane, heptane, octane and cyclohexane, as well as aromatic hydrocarbons such as benzene, toluene and xylene. Where required in molding the resulting ultra-high molecular weight polyethylene, mention may also be made of such high boiling organic solvents as decalin, tetralin and kerosene. The polymerization reaction is conducted in a substantially oxygen- and water-free condition and in the presence or absence of an inert hydrocarbon as mentioned above. Conditions for the polymerization usually involve a temperature of −20° to 120° C., preferably 0° to 100° C., and a pressure of 0 to 70 kg/cm².G, preferably 2 to 60 kg/cm².g. Adjustment of the molecular weight can be done to some extent by changing polymerization conditions such as the polymerization temperature and mole ratio in the catalyst composition. But the addition of hydrogen into the polymerization system is more effective for this purpose. The polymerization is performed in the absence of hydrogen or in the presence of hydrogen at a concentration of lower than 50 moles %, preferably 0.001 to 45 mole %, more preferably 0.005 to 30 mole %, based on the total amount of the feed monomer and hydrogen. Of course, multi-stage polymerization reactions of two, three or more stages involving different hydrogen concentrations and different polymerization temperatures can be carried out without any trouble.

As to starting monomers in the preparation of the ultra-high molecular weight polyethylene, ethylene is used as a main component, and as other comonomers there may be used, for example, α-olefins having 3 to 12 carbon atoms such as propylene, butene-1, 1-hexene and 4-methylpentene-1, or dienes for the purpose of modification such as butadiene, 1,4-hexadiene, ethylidene norbornene and dicyclopentadiene. A suitable monomer content in the copolymerization can be elected. For example, in the copolymerization of ethylene and α-olefin of $C_3$ to $C_{12}$, the α-olefin content in the ethylene/α-olefin copolymer is in the range of 0 to 20 mole %, preferably 0 to 10 mole %.

Thus, the ultra-high molecular weight polyethylene is prepared by suitably selecting polymerization conditions. The intrinsic viscosity of the polyethylene at 135° C. in decalin is in the range of 5 to 50 dl/g, preferably 5 to 30 dl/gt, more preferably 10 to 25 dl/g, most preferably 12 to 25 dl/g, and the molecular weight thereof, in terms of viscosity average molecular weight, is usually not lower than 500,000, preferably 500,000 to 6,000,000 more preferably 1,000,000 to 5,000,000, most preferably 1,200,000 to 5,000,000.

(2) Producing Oriented Material of Ultra-High Molecular Weight Polyethylene

For orienting the thus-prepared ultra-high molecular weight polyethylene having an intrinsic viscosity at 135° C. in decalin of 5 to 50 dl/g, there may be adopted a method wherein the polyethylene is oriented after going through a melting step, or a method wherein the polyethylene is dissolved in a large amount of a solvent, then formed into a sheet-like gel, followed by orientation, or a method wherein the polyethylene is oriented in a solid-phase state without being dissolved in a solvent or without going through a melting step. Particularly, the method of orienting the polyethylene in a solid-phase state is preferred.

According to the orienting method in a solid-phase state, the ultra-high molecular weight polyethylene is oriented at a temperature lower than the melting point thereof, and it is preferable that a rolling step at a temperature lower than the melting point of the polyethylene be adopted prior to the orienting step. It is more desirable to go through a compression molding step at a temperature lower than the melting point of the polyethylene, prior to the rolling step. Still more preferably, there is adopted a method wherein compression molding, rolling and orienting, or stretching, are performed successively in this order.

How to perform compression molding is not specially limited. It is optional which is batch process and continuous process is to be adopted. As an example of a batch type compression molding method there is mentioned a method using any of various machines, including slide type and rotary type. For the continuous type compression molding, various methods are available. For example, there may be adopted a method wherein the polyethylene is sandwiched in between a pair of opposed upper and lower endless belts and compression molding is performed while the endless belts are moved. In the present invention, the adoption of the continuous method is preferred from the standpoint of working efficiency and the productivity of elongated materials.

A more detailed description will be provided below about such continuous compression molding process. First, a brief explanation will be made with reference to FIG. 1 which shows an example of apparatus to be used.

This apparatus basically includes a pair of opposed upper and lower endless belts 5, 6 which are tensed by rolls 1 to 4, and pressing means comprising pressure plates 7 disposed inside the endless belts for pressing a powdered samples through the endless belts and roller groups 8 each composed of rollers which are interconnected rotatably between the associated pressure plate and endless belt.

As to each such group of rollers interconnected rotatably through the associated pressure plate and endless belt, it is suitable that the rotational axis of each roller be substantially perpendicular to the traveling direction of the endless belt and that the rollers be arranged in a large number and in a closely spaced relation to one another to such an extent as to prevent mutual contact.

The rollers are each fixed in the axial end positions by means of chain 9. Preferably, by engaging the chain 9 with sprockets 10 disposed in front and in the rear of the pressure plates, the roller groups are allowed to travel at a speed of about half of the traveling speed of the endless belts.

The roller groups may be interposed in a fixed state to a frame or the like between the endless belts and the pressure plates.

The pressure plates are not specially limited if only their surfaces which come into contact with the roller groups are smooth and permit uniform transfer of pressure.

Figure 2:
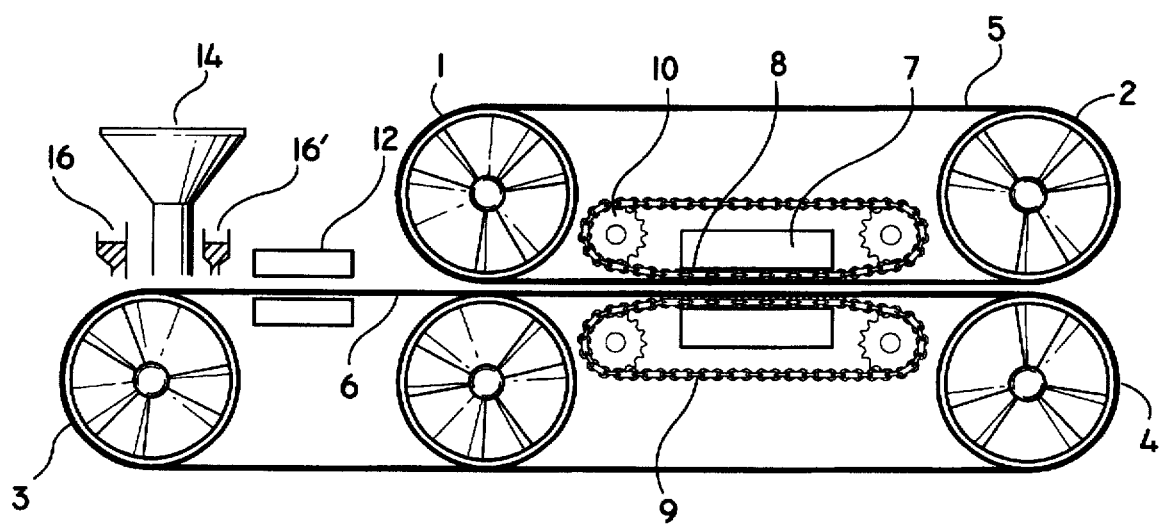
FIG. 2 is an enlarged diagram of a pressing portion and the vicinity thereof in the apparatus illustrated in FIG. 1 wherein Parts 1–4 are rolls, 5 and 6 are endless belts, 7 is a pressure plate, 8 is a roller group, 9 is a chain, 10 is a sprocket, 11 is a heating means, 12 is a preheater, 13 is a heat insulating portion, 14 is a hopper and 15 is a hydraulic piston.

The length of each pressure plate in the traveling direction of the endless belts is not specially limited, but usually it is in the range of 30 to 400 cm, preferably 50 to 200 cm. It is a principal role of the pressure plates to press the ultra-high molecular weight polyethylene, but it is also possible to use the pressure plates as heating means for the powder to be compressed. Actually, it is convenient to arrange like FIG. 2 wherein heating means 11 are disposed within the pressure plates and the heat from the pressure plates is transmitted through the roller groups and endless belts to the powder to be compressed, which is heated thereby, or arrange like FIG. 1 wherein a preheater 12 is disposed in proximity to the endless belts.

As a disposing mode of the heating means 11 in each pressure plate, an electric heater may be embedded in the pressure plate through a heat insulating portion 13, or for heating using heat transfer medium, a heat transfer medium circulation path may be formed within the pressure plate.

For practising the process of the present invention using the illustrated apparatus, first the ultra-high molecular weight polyethylene powder which has been fed into a hopper 14 is allowed to drop onto the endless belt 6 located under the hopper.

The endless belt traveling speed, which also depends on the length of each pressure plate and compressing conditions, is usually in the range of 10 to 500 cm/min, preferably 50 to 200 cm/min. The ultra-high molecular weight polyethylene powder, or a mixture thereof with an olefin polymer, is made into a predetermined sectional shape by means of a doctor blade and is preheated, if necessary, by means of a heater, then is moved up to the nipping portion between the upper and lower endless belts, then to the compressing portion where the roller groups and the pressure plates are disposed. In the compressing portion, pressure from hydraulic cyclinders (not shown) is transferred to hydraulic pistons 15 and pressure plates 7, then further through the roller groups and endless belts to the powder to be compressed. At this time, the heat from the heaters is also transmitted to the powder to be compressed through the roller groups and endless belts, whereby the temperature of the powder to be compressed is maintained at predetermined level.

The resulting sheet passes through the roll portion and thereafter leaves the endless belts. In this way, such compression-molded sheet is obtained continuously.

Although the pressure to be used in the compression molding process can be selected over a wide range, it is usually in the range of 0.01 MPa to 2 GPa, preferably 1 to 500 MPa. Particularly in the case of the continuous type, by selecting a suitable method it is sometimes made possible to effect compression molding to a satisfactory extent even at a low pressure of usually 0.01 to 10 MPa, preferably 0.1 to 5 MPa. As to the temperature to be adopted in the compression molding process, it is preferably lower than the melting point of the ultra-high molecular weight polyethylene. Usually it is in the range of 20° C. to lower than the said melting point, preferably 90° to 140° C., more preferably 100° to 135° C.

Description is now directed to the rolling process. For the rolling there may be adopted a known method such as, for example, rolling using rolls. In this case, the ultra-high molecular weight polyethylene or the compression-molded sheet obtained using such polyethylene is maintained in a solid-phase state without being melted and in this state it is pressed between rolls rotating in different directions, to afford rolled sheet or film. A desired deformation ratio of the material in the rolling operation can be elected over a wide range and usually it is selected in the range of 1.2 to 20, preferably 1.5 to 10, in terms of rolling efficiency (length after rolling/length before rolling). In this case, a suitable temperature is selected usually in the range of 20° C. to lower than the melting point of the ultra-high molecular weight polyethylene used, preferably 50° C. to lower than the said melting point, more preferably 90° to 140° C., most preferably 110° to 135° C. It goes without saying that the above rolling operation may be repeated twice or more in the form of multi-stage rolling.

For orientation, various methods are available and no special limitation is placed thereon if only the object of the present invention is not impaired. First, as examples of heating means there are mentioned those using hot air, cyclinder, roll and hot plate, respectively. As means for applying a stretching tension there may be adopted a method wherein stretching is performed between nip rolls, or a method wherein tension is applied between clover rolls or multi-stage rolls, or a method wherein stretching is performed while holding a stretching tension in accordance with the Nelson roll method.

As to the stretching temperature, there is used a temperature lower than the melting point of the product to be stretched, usually in the range of 20° to 160°, preferably 60° to 150° C., more preferably 90° to 145° C., most preferably 90° to 140° C. Also as to the stretching process, it is not limited to a one-stage process, but there may be adopted a multi-stage process. In this case, it is desirable that the second stage be carried out at a temperature higher than in the first stage.

The stretching speed differs depending on how to perform the tension stretching, as well as the molecular weight and composition ratio of the polymer used, and can be selected suitably, but usually it is in the range of 1 mm/min to 500 m/min. More specifically, in the case of batch type stretching, the stretching speed is usually in the range of 1 to 500 mm/min, preferably 1 to 100 mm/min, more preferably 5 to 50 mm/min. On the other hand, in the case of continuous stretching, the stretching speed is usually in the range of 0.1 to 500 m/min, preferably 1 to 200 m/min, more preferably 10 to 200 m/min. From the economic point of view, a higher stretching speed is preferred.

As to the stretch ratio, since the higher the stretch ratio, the higher the strength of the resulting oriented material, it is desirable to set the stretch ratio as high as possible. Usually, the stretch ratio is in the range of 1.5 to 50, preferably 2 to 40, more preferably 3 to 30, in terms of the stretch ratio to the original length. In the present invention, a total stretch ratio which is the sum of rolling ratio and stretch ratio can be set usually to a value of 20, preferably not lower than 30, more preferably not lower than 60, more preferably 80 to 200.

It is desirable that the compression molding and/or the rolling, prior to the stretching in a solid-phase state, be carried out at d temperature lower than the melting point [TmO (°C.)] of the ultra-high molecular weight polyethylene used. If the temperature exceeds TmO, the subsequent stretching step may be badly influenced. It is preferable that the melting point [Tm1 (°C.)] of the compression-molded or rolled product after the compression molding step and/or the rolling step in a solid-phase state satisfy the following relationship:

$$Tm1 \geq TmO - 5$$

In the compression molding conducted prior to the stretching step in a solid-phase state there may be used a liquid organic compound such as, for example, decalin, xylene or n-paraffin within the range not impairing the object of the present invention. Further, the compression molding and/or the rolling may be carried out in the presence of a modified (co)polymer obtained by graft reaction of an ethylene polymer or an ethylene/-olefin copolymer in the presence of an unsaturated carboxylic acid and/or a derivative thereof and an organic peroxide, or an ethylene/vinyl ester copolymer having a comonomer concentration of not higher than 30 wt %, or an adhesive resin exemplified by an ethylene/acrylic esther copolymer.

On the other hand, as mentioned previously, an oriented polyethylene material can be produced also by dissolving the ultra-high molecular weight polyethylene in a solvent, making it into a sheet-like gel, followed by rolling using rolls and subsequent tension stretching, or by subjecting the said gel to tension stretching. In this case, it is desirable that the same conditions as the foregoing conditions be adopted for the rolling and the tension stretching.

In this way there is obtained an oriented polyethylene material, whose tensile modulus is usually not lower than 60 GPa, more generally not lower than 80 GPa, still more generally 120 to 150 GPa, and whose tensile strength is usually not lower than 0.7 GPa, more generally not lower than 1.5 GPa, still more generally not lower than 2 GPa.

The polyethylene material of high strength and high elastic modulus thus produced may be further subjected to splitting or fibrillating, e.g. ultrasonic wave treatment, or may be twisted before use. [Effects of the Invention]

The ultra-high molecular weight polyethylene powder used in the process of the present invention exhibits the following effects (features).

(1) Because of superior processability, it is possible to effect stretching at a high stretch ratio, whereby a polyethylene material (e.g. fiber or film) of high strength and high elastic modulus can be produced in an extremely stable manner.

(2) Because of superior processability, it is possible to effect stretching at a high speed, using a reduced power, whereby a polyethylene fiber, film or the like of high strength and high elastic modulus can be produced in an extremely economical manner.

[EXAMPLES]

The present invention will be described below concretely in detail by way of Examples, but it is to be understood that the invention is not limited thereto.

Example 1
(1) Preparation of Solid Catalyst Component 1.9 g of $MgCl_2$ and 13.6 ml of tetrabutoxytitanium were placed in a thoroughly dried 100 ml flask in a nitrogen atmosphere and reaction was allowed to take place at 90° C. for 2 hours under stirring, then 5 ml of hexane was added at 40° C. for dilution. This reaction product will hereinafter be referred to as component [A].

Next, in a thoroughly dried 300 ml flask, 40 ml of dibutyl ether was dropwise added under stirring to 10 g of $AlCl_3$ in a nitrogen atmosphere, then the temperature was raised to 40° C. and reaction was allowed to take place for 2 hours. This reaction product is designated component [B].

While component [B] was stirred at 40° C., component [A] was dropwise added into component [B]. After completion of the dropwise addition, the temperature was lowered to room temperature and the supernatant liquid was removed by decantation, followed by washing with five 200 ml portions of hexane, to afford a solid catalyst component. 1.5 wt % of titanium was contained in the solid catalyst component.

(2) Polymerization of Ethylene 30 l of hexane, 5 mmol of triethylaluminum, 5 mmol of indene and 50 mg of the solid catalyst component prepared above were fed successively in this order into a 50 l autoclave at room temperature in a nitrogen atmosphere, then the temperature was raised to 60° C. and hydrogen was introduced at a rate of 0.5 kg/cm². Polymerization was conducted for 3 hours while ethylene was fed to maintain the total pressure at 10 kg/cm².G. There was obtained an ultra-high molecular weight polyethylene powder having a bulk density of 0.45 g/cm³, an average particle diameter of 100 μm and an intrinsic viscosity (at 135° C. in decalin) of 16.2 dl/g.

(3) Evaluation of Orientation

| a) | Compression Molding | | | |
|---|---|---|---|---|
| 1) | Roll | Diameter | 500 mm Face length | 300 mm |
| 2) | Steel belt | Wall thickness | 0.6 mm Width | 200 mm |
| 3) | Roller of small dia. | Diameter | 12 mm Face length | 250 mm |
| 4) | Pressure plate | Length | 1000 mm Width | 200 mm |
| 5) | Hydraulic cyclinder | Diameter | 235 mm | |

Using the above compression molding apparatus which sets of rollers of small dia, all accommodated within the respective steel belts, the rollers in each set connected together, and said sets of rollers being arranged movably in an endless fashion between respective apparatus and the endless belts associated therewith, the ultra-high molecular weight polyethylene powder prepared above was heated to 130° C. and compression-molded continuously at an average pressure of about 50 kg/cm², at a rate of 1 m/min, into sheet having a wall thickness of 1.1 mm and a width of 100 mm.

The sheet was then fed between a pair of upper and lower rolls rotating in opposite directions at the same speed and spaced from each other at a distance of 30 μm, the rolls each having a diameter of 150 mm, a face length of 300 mm and having been adjusted their surface temperature to 140° C., and rolls was performed at a rolling ratio of 7X to afford film.

| b) | Stretching | | | |
|---|---|---|---|---|
| 1) | Heating Member | | | |
| | Metallic roll for preheating | 3 rolls | Diameter 250 mm Face length | 200 mm |
| | Metallic roll for stretching | 1 roll | Diameter 125 mm Face length | 200 mm |

Oil for heat transfer medium was circulated through the interior of each roll. The roll-to-roll distance was 30 mm.

| 2) | Matallic roll for cooling | 3 rolls | Diameter | 250 mm Face length | 200 mm |
|---|---|---|---|---|---|
| 3) | Nip Roll | | | | |
| | Inlet Side: | | A 200 mm dia. roll nips for two preheating metal rolls. | | |
| | Outlet side: | | A 200 mm dia. roll nips for two cooling metal rolls. | | |

The resulting rolled sheet was cut into 20 mm wide tape by means of a slitter. The tape was then subjected to tension stretching using the above stretching apparatus. The tension stretching was repeated three times under the conditions set forth in Table 1 below. A total stretch ratio, including the stretching by rolling, was 112X.

TABLE 1

| | Temperature of Metallic Rolls (°C.) | | Peripheral Speed of Nip Rolls (m/min) | | Stretch Ratio |
|---|---|---|---|---|---|
| | for preheating | for stretching | inlet side | outlet side | (X) |
| first | 135 | 140 | 1 | 4 | 4 |
| second | 140 | 145 | 4 | 10 | 2.5 |
| third | 140 | 150 | 10 | 15 | 1.6 |
| TOTAL | | | | | 16 |

Tensile strength and tensile modulus of the resulting stretched tape were measured using a tensile tester, strograph R, at a temperature of 23° C. and a pulling rate of 100 mm/min. The tensile modules was calculated using a stress at 0.1% strain. A sectional area of the test piece necessary for the calculation was determined by measuring the weight and length of the test piece at a polyethylene density of 1 g/cm³. The results of evaluation of the stretched tape are as shown in Table 2.

Comparative Example 1

The procedure of Example 1 was repeated except that indene and hydrogen were not used in the polymerization of ethylene in (2). As a result, there was obtained 3,000 g of an ultra-high molecular weight polyethylene powder having a bulk density of 0.40 g/cm³, an average particle diameter of 120 µm and an intrinsic viscosity (at 135° C. in decalin) of 14.5 dl/g. The resulting stretched tape was evaluated for physical properties, the results of which are shown in Table 2.

Comparative Example 2

The procedure of Example 1 was repeated except that in the polymerization of ethylene in (2) the polymerization temperature was changed from 60° C. to 58° C. and that indene was not used. The resulting stretched tape was evaluated for physical properties, the results of which are shown in Table 2.

Comparative Example 3

The procedure of Example 1 was repeated except that indene and hydrogen were not used in the polymerization temperature was changed to 65° C. and that hydrogen was not used. The resulting stretched tape was evaluated for physical properties, the results of which are shown in Table 2.

Example 2

The procedure of Example 1 was repeated except that in the polymerization of ethylene in (2) the amount of indene used was changed from 5 mmol to 25 mmol. The resulting stretched tape was evaluated for physical properties, the results of which are shown in Table 2.

Example 3

The procedure of Example 1 was repeated except that in the polymerization of ethylene in (2) the amount of indene used was changed from 5 mmol to 1 mmol. Physical properties of the resulting stretched tape were evaluated. The results obtained are as set out in Table 2.

Example 4

The procedure of Example 1 was repeated except that the following solid catalyst component was used.
(Preparation of Solid Catalyst Component)

1.9 g of $MgCl_2$ and 13.6 ml of tetrabutoxytitanium were placed in a thoroughly dried 100 ml flask in a nitrogen atmosphere, and reaction was allowed to take place at 90° C. for 2 hours under stirring. This reaction product is designated component [A].

Next, 20 g of $AlCl_3$ and 30 ml of hexane were charged into a thoroughly dried 300 ml flask in a nitrogen atmosphere, then 40 ml of $Si(OEt)_4$ was dropwise added slowly under stirring and reaction was allowed to proceed at 40° C. for 2 hours. This reaction product is designated component [B].

While component [B] was stirred at 40° C., component [A] was dropwise added slowly into component [B]. After completion of the dropwise addition, the temperature was lowered to room temperature and the supernatant liquid was removed by decantation, followed by washing with five 200 ml portions of hexane, to afford a solid catalyst component. 1.7 wt % of titanium was contained in this catalyst component.

Physical properties of the resulting stretched tape were evaluated. The results obtained are as set out in Table 2.

Example 5

The procedure of Example 1 was repeated except that the following solid catalyst component was used.
(preparation of Catalyst)

10.0 g of $MgCl_2$, 4.3 g of aluminum triethoxide and 1.65 ml of $TiCl_4$ were placed in a nitrogen atmosphere into a stainless steel pot having an internal volume of 400 ml and containing 25 stainless steel balls each 1.27 cm in diameter, and ball-milled at room temperature for 24 hours to afford a solid catalyst component containing 4.0 wt % of titanium.

Physical properties of the resulting stretched tape were evaluated. The results obtained are as set out in Table 2.

Example 6

The procedure of Example 1 was repeated except that the following solid catalyst component was used.
(Preparation of Solid Catalyst Component)

10.0 g of $MgCl_2$, 4.3 g of aluminum triethoxide, 0.85 ml of $TiCl_4$ and 1.0 ml of $VCl_4$ were placed in a nitrogen atmosphere into a stainless steel pot having an internal volume of 400 ml and containing 25 stainless steel balls each 1.27 cm in diameter, and ball-milled at room temperature for 24 hours to afford a solid catalyst component containing 4.0 wt % of titanium.

Physical properties of the resulting stretched tape were evaluated. The results obtained are as set forth in Table 2.

Example 7

The procedure of Example 1 was repeated except that in the polymerization of ethylene in (2) 5 mmol of cyclopentadiene was used as a substitute for 5 mmol of indene. The resulting stretched tape was evaluated for physical properties, the results of which are shown in Table 2.

Example 8

The procedure of Example 1 was repeated except that in the polymerization of ethylene in (2) 5 mmol of methylisopropylcyclopentadiene was used as a substitute for 5 mmol of indene. The resulting stretched tape was evaluated for physical properties, the results of which are shown in Table 2.

Example 9

The procedure of Example 1 was repeated except that in the polymerization of ethylene in (2) 5 mmol of phenylindene was used as a substitute for 5 mmol of indene. The resulting stretched tape was evaluated for physical properties, the results of which are shown in Table 2.

TABLE 2

Results of Orientation Evaluation

| | Polymerization Conditions | | | | | | Results of Polymerization | | Intrinsic | Evaluation of Orientation | | | | |
|---|---|---|---|---|---|---|---|---|---|---|---|---|---|---|
| Example | Amount of Catalyst mg | Amount of TEA mmol | Amount of Indene mmol | Amount of Hydrogen kg/cm² | Temp. °C | Time h | Total Pressure kg/cm²G | Yield g | Bulk Density g/cm³ | Viscosity [η] dl/g | Rolling Ratio | Stretch Ratio | Total Ratio | Elastic Modulus GPa | Strength GPa |
| Ex. 1 | 50 | 5 | 5 | 0.5 | 60 | 3 | 10 | 900 | 0.45 | 16.2 | 7 | 16 | 112 | 160 | 2.8 |
| Exa. 2 | 50 | 5 | 25 | 0.5 | 60 | 3 | 10 | 800 | 0.45 | 16.8 | 7 | 17 | 119 | 155 | 2.9 |
| Exa. 3 | 50 | 5 | 1 | 0.5 | 60 | 3 | 10 | 1500 | 0.43 | 15.3 | 7 | 15 | 105 | 149 | 2.5 |
| Exa. 4 | 50 | 5 | 5 | 0.5 | 60 | 3 | 10 | 950 | 0.40 | 15.0 | 7 | 16 | 112 | 154 | 2.9 |
| Exa. 5 | 50 | 5 | 5 | 0.5 | 60 | 3 | 10 | 2000 | 0.29 | 15.2 | 7 | 15 | 105 | 148 | 2.5 |
| Exa. 6 | 50 | 5 | 5 | 0.5 | 60 | 3 | 10 | 1500 | 0.28 | 14.9 | 7 | 16 | 112 | 168 | 2.6 |
| Comp. Ex. 1 | 50 | 5 | 0 | 0 | 65 | 3 | 10 | 3000 | 0.40 | 14.5 | 7 | 10 | 70 | 123 | 1.5 |
| Comp. Ex. 2 | 50 | 5 | 0 | 0.5 | 58 | 3 | 10 | 2800 | 0.35 | 16.3 | 7 | 13 | 91 | 120 | 1.3 |
| Comp. Ex. 3 | 50 | 5 | 5 | 0 | 65 | 3 | 10 | 1000 | 0.39 | 15.9 | 7 | 13 | 91 | 135 | 1.6 |
| Exa. 7 | 50 | 5 | 5 | 0.5 | 60 | 3 | 10 | 910 | 0.40 | 16.3 | 7 | 16 | 112 | 158 | 2.5 |
| Exa. 8 | 50 | 5 | 5 | 0.5 | 60 | 3 | 10 | 900 | 0.42 | 16.2 | 7 | 16 | 112 | 150 | 2.2 |
| Exa. 9 | 50 | 5 | 5 | 0.5 | 60 | 3 | 10 | 850 | 0.41 | 16.0 | 7 | 15 | 105 | 148 | 2.1 |

What is claimed is:

1. A process for producing a polyethylene material of high strength and high elastic modulus, characterized by orienting an ultra-high molecular weight polyethylene having an intrinsic viscosity at 135° C. in decalin of 5 to 50 dl/g by stretching the ultra-high molecular weight polyethylene to a stretch ratio of not lower than 30:1, said ultra high molecular weight polyethylene being prepared by homopolymerizing ethylene or copolymerizing ethylene and an alpha-olefin in the presence of a catalyst system and hydrogen, said catalyst system comprising (1) a solid catalyst component containing at least magnesium and titanium, (2) an organometallic compound and (3) a compound represented by the following general formula I:

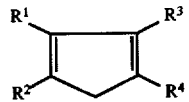

where $R^1$, $R^2$, $R^3$ and $R^4$, are each hydrogen or a hydrocarbon radical, provided any two of $R^1$, $R^2$, $R^3$ and $R^4$ may cojointly form a cyclic hydrocarbon radical.

2. The process of claim 1, wherein the hydrocarbon residue in the general formula [I] has 1 to 18 carbon atoms.

3. The process of claim 2, wherein the hydrocarbon residue in an alkyl, aryl or aralkyl group, or two hydrocarbon residues form a ring of an indene compound, a cyclopentacyclooctene compound or a fluorene compound.

4. The process of claim 1, wherein the organometallic compound is an organoaluminum compound.

5. The process of claim 1, wherein the compound of the general formula [I] is used in an amount of 0.01 to 100 moles per mole of the organometallic compound.

6. The process of claim 1, wherein the polymerization is performed at a temperature of −20° to 120° C., a pressure of 0 to 70 kg/cm².G and a hydrogen concentration of lower than 50 mole %.

7. The process of claim 1, wherein the copolymerization of ethylene is performed using ethylene and less than 20 mole % of an α-olefin.

8. The process of claim 1, wherein the ultra-high molecular weight polyethylene is subjected to stretching after going through a rolling step which is carried out at a temperature lower than the melting point of the polyethylene.

9. The process of claim 8, wherein prior to the rolling step there is performed a compression molding step at a temperature lower than the melting point of said polyethylene.

10. The process of claim 1, wherein the orientation is performed at a stretch ratio of 30 to 50.

11. The process of claim 1, wherein the oriented product is in the shape of fiber or film.

12. A process for producing a polyethylene material of high strength and high elastic modulus, characterized by orienting an ultra-high molecular weight polyethylene having an intrinsic viscosity at 135° C. in decalin of 5 to 50 dl/g, said ultra-high molecular weight polyethylene being prepared by homo- or copolymerizing ethylene in the presence of a catalyst system and hydrogen, said catalyst system comprising (1) a solid catalyst component containing at least magnesium, titanium and/or vandium (2) an organometallic compound and (3) a compound represented by the following general formula [I]:

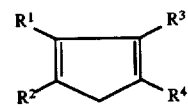

where $R^1$, $R^2$, $R^3$ and $R^4$ are each hydrogen or a hydrocarbon residue, provided any two of $R^1$, $R^2$, $R^3$ and $R^4$ may conjointly form a cyclic hydrocarbon residue, and stretching the ultra-high molecular weight polyethylene to a stretch ratio of not lower than 30.

13. A process for producing a polyethylene material comprising:

(a) providing a catalyst system comprising (1) a solid catalyst component containing at least magnesium, titanium and/or vanadium (2) an organometallic compound and (3) a compound of the formula:

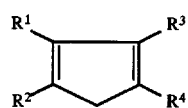

where $R^1$, $R^2$, $R^3$ and $R^4$, are each hydrogen or a hydrocarbon radical, provided any two of $R^1$, $R^2$, $R^3$ and $R^4$ may cojointly form a cyclic hydrocarbon radical;

(b) producing an ultra-high molecular weight polyethylene material by material by polymerizing one or more monomers selected from the group consisting of ethylene and alpha-olefins in the presence of hydrogen and the catalyst system; and (c) stretching the ultra-high weight polyethylene material to a stretch ratio of not lower than 30:1.

14. A process as in claim 13 wherein the ultra-high molecular weight material produced in step (b) has an intrinsic viscosity at 135° C. in decalin of 5 to 50 dl/g.

15. A process as in claim 13 wherein the one or more monomers polymerized in step (b) are selected from the group consisting of ethylene and alpha-olefins having 3 to 12 carbon atoms.

16. A film made from a polyethylene material prepared in accordance with the process of claim 1.

17. A fiber made from a polyethylene material prepared in accordance with the process of claim 1.

18. A film made from a polyethylene material prepared in accordance with the process of claim 13.

19. A fiber made from a polyethylene material prepared in accordance with the process of claim 13.

20. The process of claim 1 for producing a polyethylene material of high strength and high elastic modulus, wherein the alpha-olefin is an alpha-olefin having 3 to 12 carbon atoms.

* * * * *